United States Patent [19]

Clarey et al.

[11] Patent Number: 5,066,832
[45] Date of Patent: Nov. 19, 1991

[54] PLASTIC ENCLOSURE BOX FOR ELECTRICAL APPARATUS

[75] Inventors: Robert J. Clarey, Brookfield; Richard A. Reiner, Colgate, both of Wis.

[73] Assignee: Eaton Corporation, Cleveland, Ohio

[21] Appl. No.: 426,839

[22] Filed: Oct. 26, 1989

[51] Int. Cl.$^5$ .............................. H05K 5/00
[52] U.S. Cl. ...................... 174/50; 174/51; 174/65 R; 220/4.02; 220/4.03
[58] Field of Search ............ 174/50, 51, 65 R; 361/390; 220/4.02, 4.03

[56] References Cited

U.S. PATENT DOCUMENTS

| | | | |
|---|---|---|---|
| 2,924,702 | 2/1960 | Block | 362/375 |
| 3,634,598 | 1/1972 | Stanfield | 174/65 RX |
| 3,714,369 | 1/1973 | Bunten | 174/38 |
| 3,728,470 | 4/1973 | Maier | 174/58 |
| 4,708,453 | 11/1987 | Fryda et al. | 354/320 |
| 4,710,853 | 12/1987 | Reinhardt | 361/391 |
| 4,731,501 | 3/1988 | Clark et al. | 174/65 R |

Primary Examiner—Leo P. Picard
Assistant Examiner—David A. Tone
Attorney, Agent, or Firm—L. G. Vande Zande

[57] ABSTRACT

A plastic load center box economically provided by duplicate molded end sections joined by an intermediate section of uniform cross-section which is readily provided in selected lengths in either molded or extruded form. End walls receive metal inserts electrically interconnected to provide grounding when attached to grounded conduit, or plastic inserts where the load center application does not require grounded conduit. Molded end sections have formed knockouts and wire clamping tabs.

20 Claims, 2 Drawing Sheets

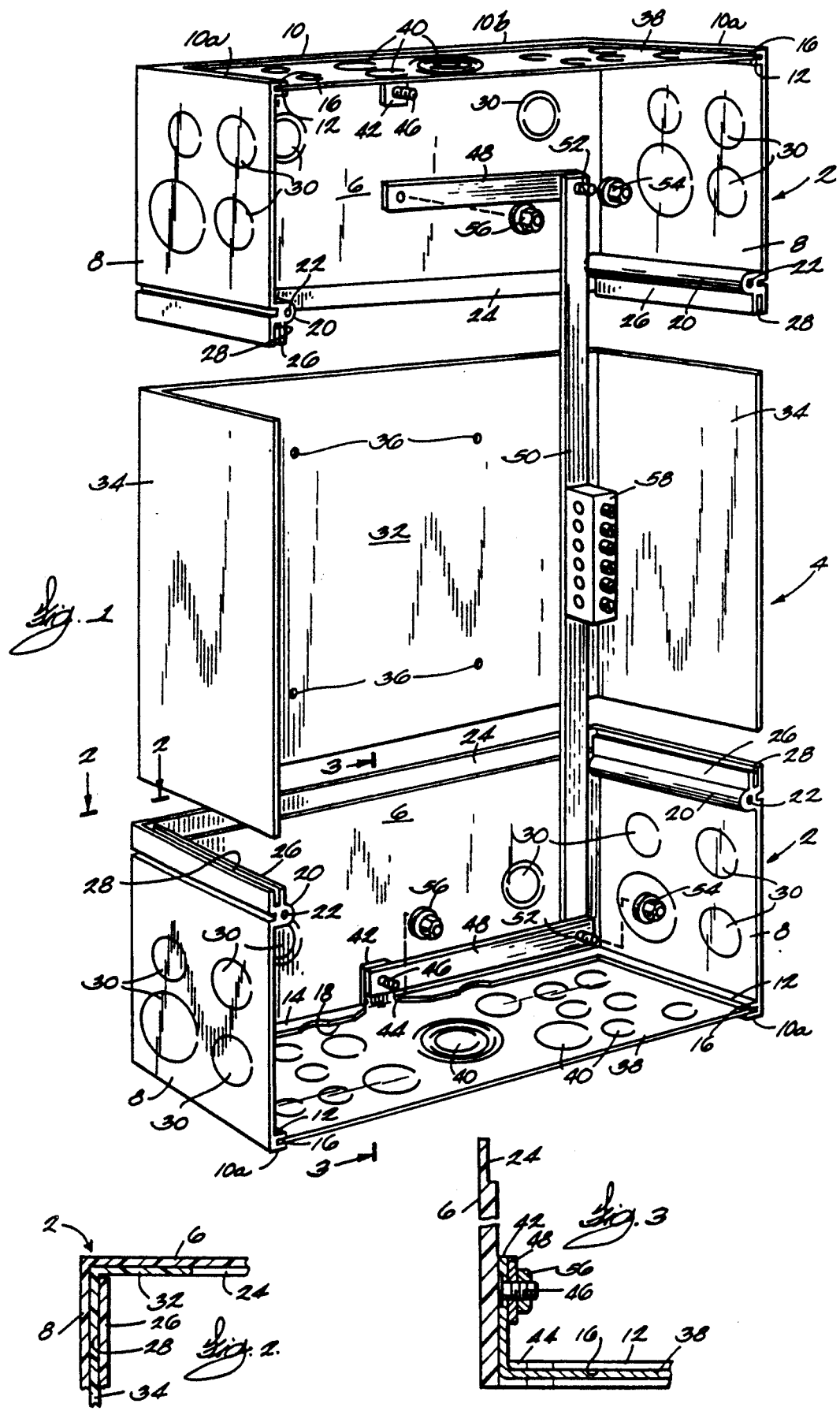

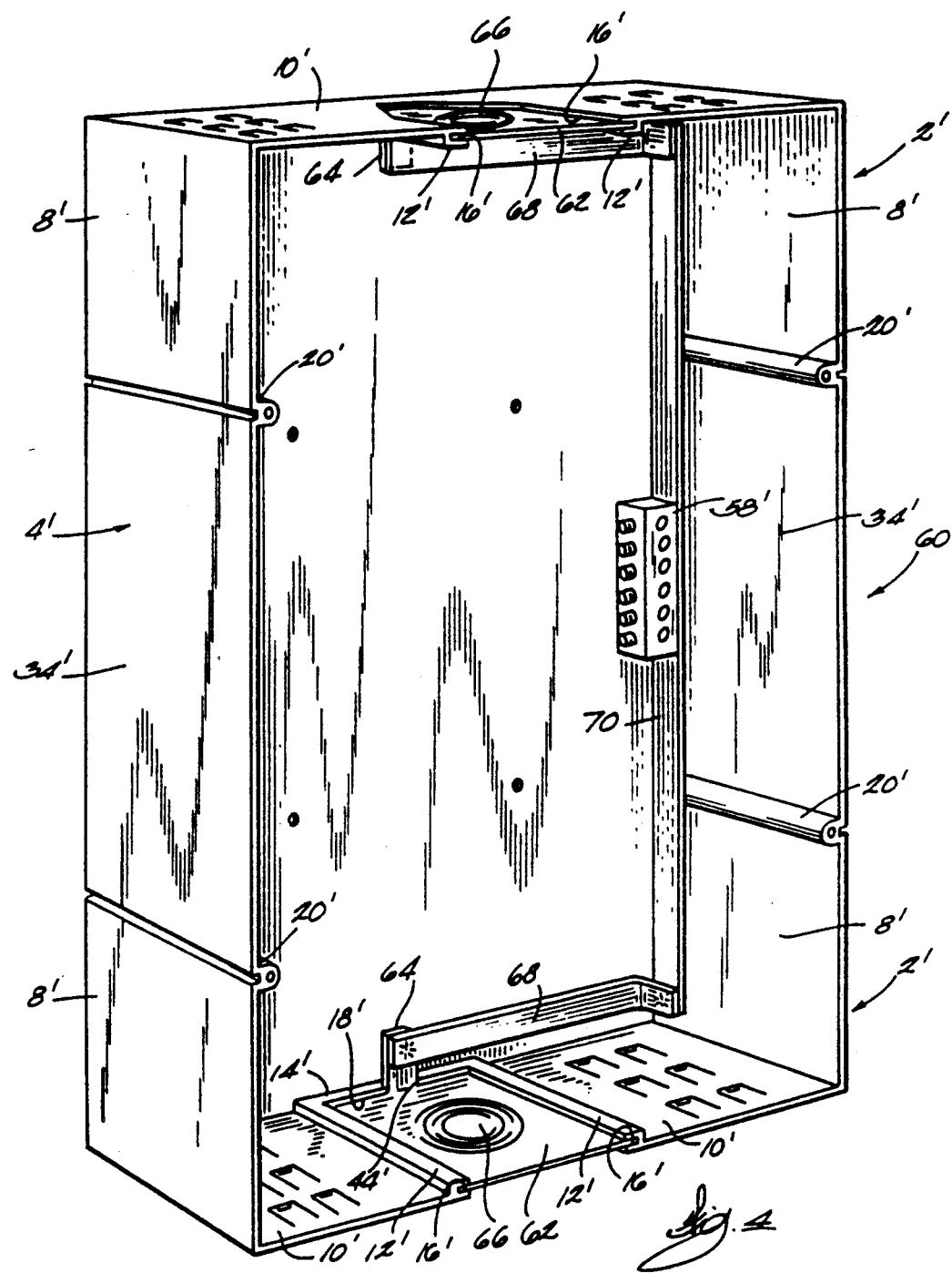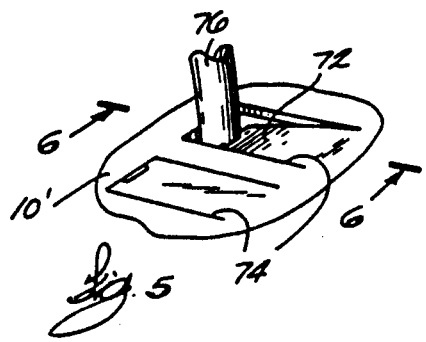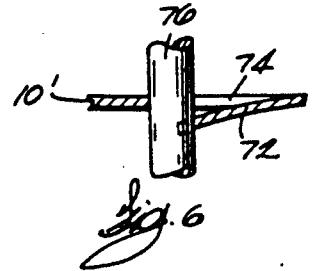

PLASTIC ENCLOSURE BOX FOR ELECTRICAL APPARATUS

BACKGROUND OF THE INVENTION

This invention relates to plastic enclosures for electrical apparatus, and more particularly to plastic enclosure boxes for load centers Still more particularly, the invention relates to plastic boxes of the aforementioned type which may be used in an electrically grounded system.

The use of molded plastic enclosures for electrical apparatus in place of formed and fabricated sheet metal enclosures is increasing. Although the manufacturing cost for molded plastic enclosures is slightly greater than the manufacturing cost for highly tooled fabrication of a comparable sheet metal enclosure, the plastic enclosures offer several advantages over the sheet metal enclosures. For example, a plastic enclosure box can be made quicker and with fewer manufacturing steps (e.g. welding and painting), than a comparable formed and fabricated sheet metal box. The plastic box may be colored and is corrosion resistant without painting. Sharp edges and corners of the sheet metal enclosures, which offer potentially sharp cutting edges, are avoided in plastic enclosures by providing fillets and radii where appropriate. Moreover, the plastic enclosure is electrically insulative, thereby reducing electrical shock hazard of the enclosure and eliminating certain insulators required in metal boxes. Still another advantage is that many incidental features such as mounting, attachment and snaptogether structure and the like can be readily incorporated in the molded plastic enclosure. Perhaps the most significant advantage afforded by the plastic enclosures is that they are lighter and stronger, i.e. more resistive to damage, than the sheet metal counterpart, and therefore lessen the shipping costs of the enclosures.

The foregoing advantages of molded plastic enclosures notwithstanding, electrical load centers provide certain unique considerations which have not been readily met by molded plastic technology. For example, load center enclosure boxes are provided in several lengths according to the number of circuits to be provided in the load center. Therefore, each load center having a different capacity would require its own molded enclosure box. Alternatively, a single enclosure box large enough to accommodate all sizes of interior panels and circuit capacities could be used, resulting in wasted space within the interior of the enclosure box for all but the largest capacity load center. Furthermore, a load center may be used as service entrance equipment, in which case the metal box becomes a part of an electrically grounded system, or it may be used as a sub-fed device (i.e. in a multiple unit dwelling) wherein the box is not required to be a part of the electrical grounding system. The particular end use of a given load center is not known at the time of its manufacture and perhaps not known at the time it is sold from distributor stock. Thus, where it is desired to use a plastic enclosure box in a grounded system application, it is necessary to provide special grounding attachment hardware on the conduit or metallic sheath cable which is connected to the box.

SUMMARY OF THE INVENTION

This invention provides a plastic enclosure box for electrical apparatus which is particularly well suited for electrical load centers. It provides a molded end section which has knockout and/or non-metallic sheathed cable retention features molded into the walls thereof and which is used in pairs, attached at opposite ends of an extruded intermediate channel-shaped section of selective length, to provide a load center of a selective length. The end section is structured to receive the intermediate channel-shaped section in an overlapped relation which facilitates attachment of the two sections together. The end wall of the molded end section is provided with an opening having opposed grooves at its edges to slidably receive a filler plate which may be plastic or metal according to the desired use of the load center. Metal plates inserted at each end are joined together within the box by an electrically conductive strap which also serves to mount a neutral assembly wiring connector within the box. Other features and advantages provided by this invention will become readily apparent when reading the following description and claims in conjunction with the accompanying drawings.

BRIEF DESCRIPTION OF THE DRAWINGS

FIG. 1 is an exploded view of an unassembled plastic enclosure box in accordance with this invention;

FIG. 2 is a fragmentary cross sectional view taken generally along the line 2—2 in FIG. 1 after the intermediate section and end section have been assembled together;

FIG. 3 is a fragmentary cross sectional view taken along the line 3—3 in FIG. 1 showing a grounding strap connection to a metal insert plate in accordance with this invention;

FIG. 4 is a perspective view of a one piece plastic enclosure box having an alternate form of metal insert plate and electrical grounding strap;

FIG. 5 is a fragmentary perspective view of a cable retention feature incorporated into a molded end section of the plastic enclosure box of this invention; and FIG. 6 is a cross sectional view of the cable retention feature taken along the line 6—6 in FIG. 5.

DETAILED DESCRIPTION OF THE PREFERRED EMBODIMENTS

Referring to FIG. 1 of the drawings, a plastic enclosure box for a load center constructed according to this invention is illustrated in a disassembled state. The plastic box preferably comprises a pair of molded end sections 2 which are joined together by an intermediate section 4. Inasmuch as economy of scale is a significant factor in providing a plastic load center box which is cost comparable to the equivalent sheet metal box, the end sections 2 are preferably the same part used in duplication although it is contemplated that such end sections may be different from each other in length, knockout arrangement, etc. Moreover, the end section 2 is usable in pairs for each length variation of load center offered by the manufacturer. Intermediate channel-shape section 4 is preferably economically produced as an extruded channel which is subsequently cut to the desired length to provide a variety of load center boxes in various selectively predetermined lengths although this section may alternatively be provided as a sheet steel channel.

Molded end section 2 comprises a rear wall 6, side walls 8 extending forwardly from rear wall 6, and an end wall 10 contiguous with side walls 8 and extending forwardly from rear wall 6. With specific reference to the end section 2 shown in FIG. 1, end wall 10 consists only of a pair of stub portions 10a having a pair of coextensive ribs 12 extending front to rear immediately adjacent side walls 8 and a stub portion 10b located immediately adjacent rear wall 6 having a coextensive rib 14. Ribs 12 and wall portions 10a are spaced to provide front-to-rear extending grooves 16, and rib 14 and wall portion 10b are spaced to provide a groove 18 proximate the rear wall 6. Side walls 8 have front-to-rear extending tubular bosses 20 provided with holes 22 in the front surface thereof for receiving fasteners for a cover (not shown) for the load center. The inner edge of rear wall 6 is provided with a reduced thickness ledge 24. Ribs 26 are provided adjacent the inner edges of side walls 8, the ribs 26 extending from tubular bosses 20 and being spaced from the side wall 8 to provide a groove 28 along the inner edge of each side wall. Ribs 26 stop short of the reduced thickness ledge 24 at the rear wall 6 as best seen in FIG. 2. A plurality of circular knockouts 30 are molded in side walls 8 and in rear wall 6. The vertical length of side walls 8 and rear wall 6 with regard to the orientation shown in the drawing is selected to provide adequate surface for a desired number of knockouts or non-metallic sheathed cable retention tabs which will be described hereinafter.

Intermediate section 4 has a rear wall 32 and side walls 34 extending forwardly from opposite sides thereof. The length of section 4 end-to-end is variably selected to provide a box of the desired length and circuit capacity. A plurality of holes 36 may be provided in rear wall 32 by a secondary operation in the manufacture of intermediate section 4 to function as mounting holes for the interior panel of the load center End sections 2 are attached at opposite ends of intermediate section 4 by bringing the respective sections together such that the edges of side walls 34 are received within grooves 28 in an overlapping relation and the edges of rear wall 32 overlap reduced thickness ledges 24. The respective sections may be bonded together in the overlapped area by applying an adhesive or by an ultrasonic welding method, or by incorporating fasteners or snap fastening means in the overlapped area, or by other appropriate fastening means.

When the plastic box load center is to be used in a grounded system, a metal plate 38 is inserted into grooves 16 and 18 in end wall 10 of end sections 2. Plate 38 is provided with a plurality of knockouts 40 for attachment of grounded conduit or cable. A tab 42, bent at right angles to the major plane of plate 38, extends through a notch 44 in interior rib 14. In the embodiment depicted in FIGS. 1 and 3, a threaded self-clinching stud 46 is affixed to tab 42 to project outwardly therefrom. A conductive strap assembly comprising a pair of identical lateral straps 48 and a longitudinal strap 50 is secured together by threaded self-clinching studs 52 affixed at the ends of longitudinal strap 50 (similar to studs 46) and nuts 54 threaded to studs 52. The ends of lateral straps 48 remote from strap 50 have clearance holes disposed over studs 46 of tabs 42 and are bolted thereagainst by nuts 56 threaded upon studs 46. A multi-apertured wiring connector assembly 58 is attached to strap 50 to provide a neutral bar wiring connector for the load center.

An alternative embodiment is shown in FIG. 4, wherein the plastic enclosure box 60 is molded as a single member. However, it is contemplated that many of the same advantages of the three piece box described above are accomplished in the molding process by utilizing duplicated dies for the respective end sections 2' and that the die for intermediate section 4' comprising the vertical span between tubular bosses 20' can be of a selected predetermined length. In this embodiment, the end walls 10' of end sections 2' extend further from side walls 8' toward the center of box 60. Ribs 12' extending front-to-rear in spaced relation to edges of wall 10' defining an opening in the end wall join with a lateral rib 14' spaced from end wall 10, adjacent rear wall 6' to define grooves 16' and 18' as in the embodiment of FIG. 1. A metal plate 62 having a tab 64 formed at right angles thereto is inserted into grooves 16' and 18' to close off the opening. Tab 64 projects through a notch 44' in rib 14'. Plate 62 has at least one knockout 66. An alternative conductor strap assembly is provided in the embodiment of FIG. 4. This assembly comprises a pair of lateral straps 68 permanently attached to the ends of a longitudinal strap 70 such as by welding or the like. The opposite ends of lateral straps 68 are permanently attached to tabs 64 of the respective metal plates 62 also by welding or the like. The complete conductor strap assembly, including plates 62, is assembled to the plastic box as a unit, sliding the plates 62 into grooves 16' until they seat against the bottom of grooves 18'. Moreover, the longitudinal strap 70 may be disposed in a plane parallel to the plane of side walls 8' and 34' by bending the lateral straps 68 at right angles near their attachment to strap 70 as can be seen in the drawing. A multi-aperture wire connector 58' is attached to strap 70 to provide a neutral bar connector for the box.

Either box shown and described in FIG. 1 or FIG. 4 may have the conductor strap assembly and metal end plates omitted when the load center is not part of a grounded system. In this instance, plastic plates of identical size to plates 38 or 62 are provided to be inserted in the appropriate grooves to close off the openings in the end walls 10 or 10'. The plastic plates may be provided with knockouts or, more appropriately for the ungrounded system, with flexible non-metallic sheathed cable retaining tabs 72 as seen in FIGS. 4–6. Tabs 72 are cantilevered arms created by forming U-shaped slits 74 in the plastic wall. By inserting a nonmetallic sheathed cable through the wall of the box at the free end of tab 72, the tab is deflected inwardly as shown in FIGS. 5 and 6 whereby the free end of tab 72 pinches into the insulating sheathing of cable 76 to pinch the cable between the end of tab 72 and the end of slot 74, thereby preventing its inadvertent withdrawal from the box. Tab 72 may be duplicated in the end walls 10' and may be provided in the plastic insert plates in various patterns and in various combinations with circular knockouts.

The foregoing has described a plastic enclosure box for load centers which is particularly well suited for plastic fabrication. The box of this invention employs a pair of like end sections attached to an extruded intermediate section of selected length. Alternatively the box employs molding die of the type used to mold end sections 2, inset within a die wherein a constant cross section, selected length intermediate section is disposed therebetween to provide a box of predetermined length. Metal plates are inserted into grooved openings in the end walls of the box to permit its use in grounded systems, wherein the plates are electrically joined by a conductor strap. The metal plates can be substituted for by plastic plates when the load center is used in non-grounded systems. The end sections are particularly designed to have overlapping relation with the respective ends of the intermediate section. Sections are preferably joined together by bonding with an adhesive in the overlapped area, although ultrasonic welding, snap fastening structures and other attachment means are contemplated. Although a preferred embodiment and various alternative embodiments have been disclosed herein, it is to be understood that the plastic enclosure box of this invention is susceptible of various other modifications without departing from the scope of the appended claims.

We claim:

1. A plastic enclosure box adapted to receive an electrical distribution panelboard therein comprising:
   first and second end sections each comprising a rear wall, side walls extending forwardly from opposite sides of said rear wall, and an end wall continuous with said side walls and said rear wall extending forwardly from said rear wall;
   an intermediate section of uniform cross-section comprising a rear wall and opposed side walls;
   said end sections disposed at opposite ends of said intermediate section wherein said rear wall and side walls of said intermediate section are contiguous with respective rear walls and side walls of said end sections thereby defining a box having an open front side;
   openings in said end walls; and
   rigid flat filler plates slidably attached to said end walls fully losing said openings, said filler plates having deflectable tab cable retainers or knockouts for attaching electrical conductor means directly to said filler plates.

2. A plastic box as defined in claim 1 wherein said flat filler plates comprise electrically conductive metal plates having knockouts.

3. A plastic box as defined in claim 2 further comprising electrical conductor means interconnecting said metal plates of respective said end sections.

4. A plastic box as defined in claim 3 wherein said electrical conductor means comprises wiring neutral connector means.

5. A plastic enclosure box adapted to receive electrical apparatus therein comprising:
   first and second end sections each comprising a rear wall, side walls extending forwardly from opposite sides of said rear wall, and an end wall contiguous with said side walls and said rear wall extending forwardly from said rear wall,
   an intermediate section of uniform cross-section comprising a rear wall and opposed side walls;
   said end sections disposed at opposite ends of said intermediate section wherein said rear wall and side walls of said intermediate section are contiguous with respective rear walls and side walls of said end sections thereby defining a box having an open front side;
   openings in said end walls; and
   filler means attached to said end walls closing said openings, said filler means having means for attaching electrical conductor means thereto; wherein
   said end sections and said intermediate section are discrete elements, said box being provided in various predetermined lengths by selectively utilizing a said intermediate section of a specific length.

6. A plastic enclosure box as defined in claim 5 wherein said end sections are molded and comprise a plurality of knockouts, deflectable tab cable retainers or combinations of each, in walls of said end sections.

7. A plastic enclosure box as defined in claim 6 wherein said intermediate section is an extruded plastic member.

8. A plastic enclosure box as defined in claim 6 wherein said end sections are identical members.

9. A plastic enclosure box as defined in claim 6 wherein distal ends of said walls of said end sections overlap said opposite ends of said intermediate section, and means securing said end sections and said intermediate section together at overlapped ends of said sections.

10. A plastic enclosure box as defined in claim 5 wherein said filler means comprise metal plates having knockouts.

11. A plastic enclosure box as defined in claim 10 further comprising electrical conductor means interconnecting said metal plates of respective said end sections.

12. A plastic enclosure box as defined in claim 11 wherein said electrical conductor means comprises wiring neutral connector means.

13. A multi-piece box for a distribution panelboard comprising:
   a pair of molded plastic end sections each having a rear wall, side walls extending forwardly from opposite sides of said rear wall, an end wall contiguous with said side and rear walls extending forwardly from said rear wall, and an opening in said end wall extending through a forward edge of said end wall;
   an intermediate section comprising a rear wall and side walls extending forwardly form opposite sides thereof and overlapped with corresponding rear and side walls of respective said end sections, said end sections being attached to opposite ends of said intermediate section at overlapped portions of respective said walls; and
   rigid filler plates slidable attached to said end walls from said forward edges fully closing said openings, said filler plates comprising deflectable tab cable retainers or knockouts for attaching electrical conductor means directly to said filler plates.

14. A multi-piece box as defined in claim 13 wherein said intermediate section is selectively provided in various predetermined lengths between its opposite ends, thereby providing a box of a selectively predetermined length.

15. A multi-piece box as defined in claim 14 wherein said intermediate section is an extruded plastic channel.

16. A multi-piece box as defined in claim 14 wherein said intermediate section is a formed sheet metal channel.

17. A multi-piece box as defined in claim 14 wherein said end sections comprise a plurality of knockouts, deflectable tab wire retainers or combinations of each in selected walls of said end sections.

18. A multi-piece box as defined in claim 14 wherein said filler plates comprise electrically conductive metal plates having knockouts.

19. A multi-piece box as defined in claim 18 further comprising electrical conductor means interconnecting said metal filler plates of respective said end sections.

20. A multi-piece box as defined in claim 19 wherein said electrical conductor means comprises wiring neutral connector means.

* * * * *

UNITED STATES PATENT AND TRADEMARK OFFICE
CERTIFICATE OF CORRECTION

PATENT NO. : 5,066,832

DATED : November 19, 1991

INVENTOR(S) : Robert J. Clarey, Richard A. Reiner

It is certified that error appears in the above-identified patent and that said Letters Patent is hereby corrected as shown below:

Column 5, Line 30: delete "losing", insert --closing--

Column 6, Line 40: delete "slidable", insert --slidably--

Signed and Sealed this

Fourteenth Day of September, 1993

Attest:

BRUCE LEHMAN

Attesting Officer        Commissioner of Patents and Trademarks